United States Patent [19]

Asam

[11] 3,961,926

[45] June 8, 1976

[54] PREPARATION OF GERMANIA CORES IN OPTICAL FIBERS

[75] Inventor: Adolf R. Asam, Daleville, Va.

[73] Assignee: International Telephone and Telegraph Corporation, Nutley, N.J.

[22] Filed: Dec. 27, 1974

[21] Appl. No.: 536,768

[52] U.S. Cl. .................................. 65/3 A; 65/30 R; 65/120; 427/107; 427/166; 427/237; 65/3 B
[51] Int. Cl.² .................. C03C 25/02; C03C 15/00
[58] Field of Search ............. 65/120, 3 B, 30 R, 30, 65/3 A; 427/107, 166, 237

[56] References Cited
UNITED STATES PATENTS

| | | | |
|---|---|---|---|
| 2,272,342 | 2/1942 | Hyde | 65/18 |
| 3,211,583 | 10/1965 | Riley | 65/DIG. 8 |
| 3,642,521 | 2/1972 | Moltzan et al. | 65/30 R X |
| 3,644,607 | 2/1972 | Roques et al. | 65/120 X |
| 3,659,915 | 5/1972 | Maurer et al. | 65/30 R X |
| 3,669,693 | 6/1972 | Dalton et al. | 65/120 X |
| 3,729,335 | 4/1973 | Domrachev et al. | 427/237 |
| 3,884,550 | 5/1975 | Maurer et al. | 65/DIG. 7 |

Primary Examiner—Robert L. Lindsay, Jr.
Assistant Examiner—Frank W. Miga
Attorney, Agent, or Firm—John T. O'Halloran; Menotti J. Lombardi, Jr.; Richard A. Menelly

[57] ABSTRACT

A method for forming optical fibers reduces losses of germania dopant due to evaporation during chemical vapor deposition. After deposition of a high purity silica layer on the inner surface of a hollow silica tube, the tube is closed at one end and loaded with a small amount of crystalline germanium compound, such as germanium iodide. The other end is then also sealed and the tube is heated to vaporize the $GeI_4$ and deposit a coating of germanium. This process may be repeated to build up the Ge layer. The tube is then broken open at both ends and the iodine vapor removed. The germanium layer is oxidized and heated to diffuse germania into the silica layer to provide a doped high index of refraction core layer on a lower index cladding layer. The tube and layers are then collapsed to form a preform which is later drawn into the optical fiber.

5 Claims, 3 Drawing Figures

PREPARATION OF GERMANIA CORES IN OPTICAL FIBERS

BACKGROUND OF THE INVENTION

1. Field of the Invention

The present invention relates to optical fiber making processes and particularly to a novel method for reducing losses of germania dopant evaporated during chemical vapor deposition.

2. Description of the Prior Art

The use of germania as a dopant for increasing the index of refraction of a silica core of an optical fiber has been disclosed in U.S. Pat. No. 3,737,293, issued Jun. 5, 1973 and RE. 28,028, issued Jun. 4, 1974. In another known process described in copending U.S. Application Ser. No. 497,990, filed Aug. 16, 1974, a high index of refraction core layer of germania doped silica is formed by chemical vapor deposition within a lower index cladding tube to make an optical fiber preform. In this process it has been found that a large percentage of germania, up to about 70 percent, is lost by evaporation and carried away by a carrier gas.

SUMMARY OF THE INVENTION

It is therefore the primary object of the present invention to reduce the losses of germania during chemical vapor deposition of a high refractive index doped core layer within a silica cladding tube used in making optical fibers.

This is achieved by closing one end of the hollow cladding tube after deposition of a high purity silica layer and inserting a small amount of a crystalline germanium compound, such as germanium iodide, or other suitable halide. The other end is then sealed, and the tube is heated to vaporize the GeI$_4$ and deposit a coating of germanium on the silica. One or more layers may be deposited by repeating this process.

The tube is then opened at both ends and the iodine vapor removed. The germanium layer is exposed to a flow of oxygen to oxidize the layer and heated to diffuse the germanium into the silica to provide the desired high index of refraction core layer. Thereafter, the tube and core layer are collapsed to provide a preform, and then later drawn into an optical fiber. Other objects and advantages will become apparent from the following description in conjunction with the accompanying drawings.

DESCRIPTION OF THE PREFERRED EMBODIMENTS

Figure 1:
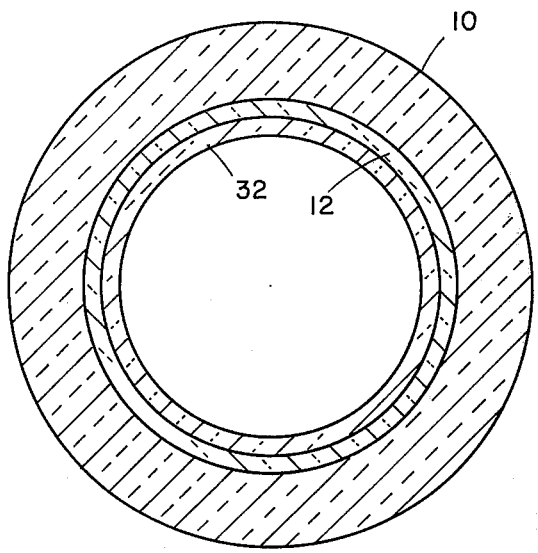
FIG. 1 shows a cross-section of a hollow tube during the coating process.

As shown in FIG. 1, a hollow silica tube 10 is provided with a first layer 12 of relatively pure silica on the inner wall by a chemical vapor deposition process, such as described in the above-mentioned copending application Ser. No. 497,990. If the hollow tube 10 is of sufficiently pure silica, the tube may be used as the cladding layer of the optical fiber; and the silica layer 12 will provide the core layer after doping. Otherwise, it is necessary to use the pure silica layer on the inner surface for the cladding. A second pure silica core layer, which is later doped, may then be applied over the cladding layer, or the first layer may be made sufficiently thick to provide both the cladding and doped core layers.

Figure 2:
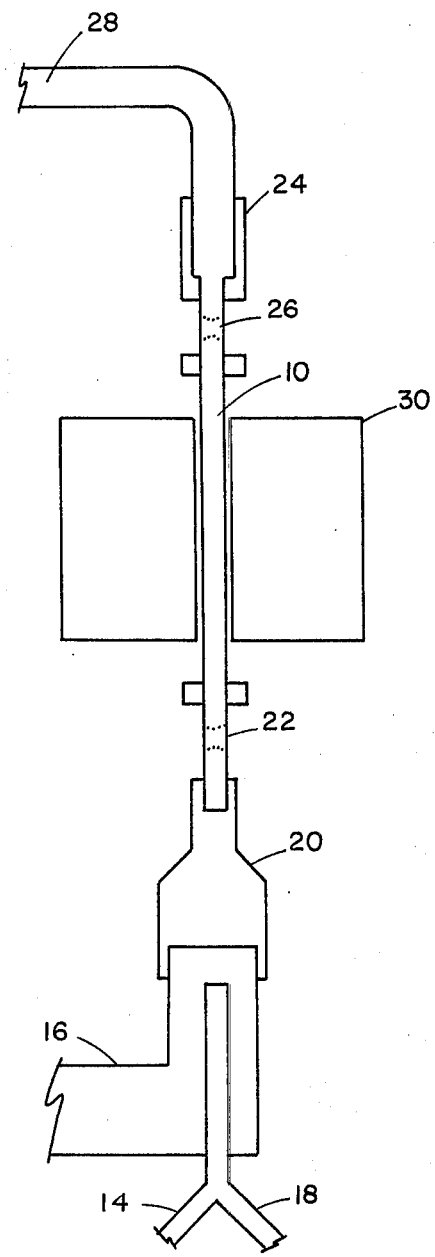
FIG. 2 is a schematic representation of the apparatus used in the coating process.

In the known process, silica and germania are codeposited to form the doped core layer on a first pure silica layer. As shown in FIG. 2, a germanium tetrachloride or tetra-iodide vapor is introduced through an inlet port 14. The GeCl$_4$ is entrained in an oxygen carrier gas introduced via another inlet port 16. A third inlet port 18 simultaneously introduces a SiCl$_4$ or SiI$_4$ vapor. An adapter 20 couples the combined vapors into the inlet opening 22 of silica tube 10. Another adapter 24 couples the outlet 26 of tube 10 to an exhaust outlet 28. With application of heat from a suitable heat source 30, this process codeposits a germania doped high refractive index silica core layer on the silica cladding layer in the tube. It also, however, results in large losses of germania which were evaporated during the deposition and carried away by the carrier gas.

In the present process, using the same apparatus, instead of codepositing germania and silica to form the core layer, a coating of germanium 32, as shown in FIG. 1, is first formed on the pure silica layer 12. This is accomplished by closing or heat sealing one end 26 of tube 10, as indicated by dotted lines, and inserting a small amount of solid crystalline germanium iodide, GeI$_4$, or other suitable halide, such as GeBr$_4$. The other end 22 is then also heat sealed and the tube heated and rotated in a glass lathe, which supports the tube during the entire deposition process. Heat is applied by source 30 to vaporize the GeI$_4$. The heat source is preferably a traversing oxygen/hydrogen or O$_2$/natural gas flame. The rotation and heat scanning distribute the vaporized GeI$_4$ along the tube, with the GeI$_4$ being vaporized at about 140°C. The GeI$_4$ sublimes at about 373°C which causes further redistribution, and the flame temperature is raised to 440°C at which point GeI$_4$ decomposes. The Ge is then deposited as a layer 32 on silica layer 12, while the I$_2$ remains as a vapor or condenses. The large differences in melting points, boiling points and vapor pressure of germanium and iodine, as indicated in the following table, are used to advantage.

|  | MELTING POINT | BOILING POINT | VAPOR PRESSURE |
|---|---|---|---|
| Ge | 937°C | 2830°C | Minute |
| I$_2$ | 113°C | 184°C | Large |

For example, as the silica tube is heated to about 1000°C, Ge will diffuse into the lattice, whereas I$_2$ will remain in the vapor phase and will be reevaporated from the hot surface.

Figure 3:
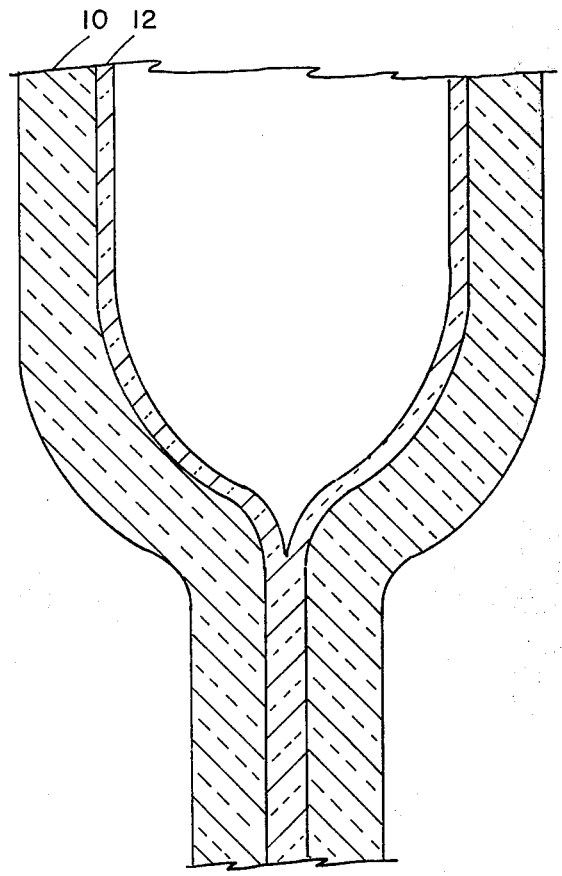
FIG. 3 shows the collapsing of the tube and coatings to form an optical fiber preform.

By then breaking both ends of the sealed tube, reconnecting the ends to the inlet and outlet ports, and heating the tube above 180°C, the condensed iodine is re-evaporated and removed with the carrier gas. The thickness of the Ge layer may be increased by repeating this process several times. After removal of the iodine, the Ge layer is oxidized by flowing pure oxygen, free of H$_2$O, through the tube while heating to 1000°C. This diffuses the GeO$_2$ into the surface regions of the SiO$_2$ layer to provide the desired doped high refractive index core layer. In order to prevent collapsing of the tube during this deposition and diffusion process, it may be desirable to evacuate the tube before sealing. Thereafter the heat is raised to about 1400°C–1700°C to collapse the tube and layers and form the desired preform, as shown in FIG. 3. Continued rotation provides uniform diffusion and collapsing. The preform is then separately drawn into a fiber in a later step.

The present process thus provides a novel method for making optical fibers with a doped high refractive index core and lower index cladding, while avoiding excessive losses of germania. While only a single embodiment has been illustrated and described, it is apparent that other variations may be made in the particular process without departing from the scope of the invention as set forth in the appended claims.

I claim:

1. A method for forming optical fibers comprising:
   supporting a hollow silica tube adjacent a heat source;
   depositing a first substantially pure silica layer on the inner surface of said tube;
   sealing said tube at one end;
   inserting a solid crystalline germanium halide compound into said tube;
   sealing the other end of said tube;
   heating said tube to vaporize and decompose said compound and coat said silica layer with a layer of germanium;
   opening said sealed tube ends;
   heating said tube while passing a carrier gas therethrough to remove the halide vapor;
   passing oxygen through said tube while further heating to oxidize said germanium and diffuse germania into said silica layer; and heating said tube and layer to collapse into an optical fiber preform.

2. The method of claim 1 wherein said germanium halide compound is selected from the group consisting of $GeI_4$ and $GeBr_4$.

3. The method of claim 2 wherein said carrier gas is oxygen.

4. The method of claim 3 wherein said heat source is a movable oxygen-hydrogen flame, and including traversing said flame over said tube to distribute the germanium coating on said silica layer and vaporize said halide.

5. The method of claim 4 including rotating said tube while heating during diffusion and collapsing to evenly diffuse said germania into said silica and collapse said tube uniformly.

* * * * *